United States Patent
Vincent

(10) Patent No.: US 9,588,624 B2
(45) Date of Patent: Mar. 7, 2017

(54) CAPACITIVE TOUCH SENSOR WITHIN WRIST WORN DEVICE

(71) Applicant: ARM IP LIMITED, Cambridge (GB)

(72) Inventor: Hugo John Martin Vincent, Cambridge (GB)

(73) Assignee: ARM IP Limited, Cambridge (GB)

(*) Notice: Subject to any disclaimer, the term of this patent is extended or adjusted under 35 U.S.C. 154(b) by 199 days.

(21) Appl. No.: 14/462,642

(22) Filed: Aug. 19, 2014

(65) Prior Publication Data

US 2015/0048847 A1     Feb. 19, 2015

(30) Foreign Application Priority Data

Aug. 19, 2013    (GB) .................................. 1314752.5

(51) Int. Cl.
| | | |
|---|---|---|
| G06F 3/044 | (2006.01) | |
| G01D 5/24 | (2006.01) | |
| G06F 1/16 | (2006.01) | |
| G06F 3/0354 | (2013.01) | |

(52) U.S. Cl.
CPC .............. G06F 3/044 (2013.01); G06F 1/163 (2013.01); G06F 3/03547 (2013.01)

(58) Field of Classification Search
CPC ....... G06F 3/044; G06F 3/03547; G06F 1/163
USPC .......................................................... 324/663
See application file for complete search history.

(56) References Cited

U.S. PATENT DOCUMENTS

| | | |
|---|---|---|
| 2003/0123329 A1 | 7/2003 | Guanter et al. |
| 2010/0207906 A1* | 8/2010 | Anglin ................. G06F 3/0414 345/174 |
| 2011/0210929 A1 | 9/2011 | Hiranobu |

FOREIGN PATENT DOCUMENTS

| | | |
|---|---|---|
| JP | 2010-020566 | 1/2010 |
| WO | WO 2012/139203 | 10/2012 |

OTHER PUBLICATIONS

Search Report for GB 1314752.5, dated Nov. 27, 2013, 3 pgs.

* cited by examiner

*Primary Examiner* — Thomas Valone
(74) *Attorney, Agent, or Firm* — Nixon & Vanderhye P.C.

(57) ABSTRACT

A wrist worn device includes a metal device housing and a capacitive touch sensor. The capacitive touch sensor includes a conductive plate which is supported by and separated from the metal body of the device housing via an isolation body formed of PTFE (low static relative permittivity). An outer plate is formed over the conductive plate and is formed of glass (high static relative permittivity). The action of the isolation body is to reduce the effect of the metal device housing on the capacitance detected by the conductive plate. The effect of the outer plate is to try to increase the effect of the capacitance associated with the object being brought into proximity with the conductive plate.

15 Claims, 3 Drawing Sheets

CAPACITIVE TOUCH SENSOR WITHIN WRIST WORN DEVICE

This application claims priority to GB Patent Application No. 1314752.5 filed 19 Aug. 2013, the entire content of which is hereby incorporated by reference.

BACKGROUND

This invention relates to the field of wrist worn devices. More particularly, this invention relates to such wrist worn devices which include a capacitive touch sensor.

It is known to provide wrist worn devices, such as smart watches, with sensors for detecting inputs from a user. Such a wrist worn device may have, for example, buttons which a user presses and a touch screen responsive to user touch. A problem within such wrist worn devices is the physically small size of the device forcing the sensors into close proximity with other components/parts of the device. This can interfere with proper operation of the sensors.

SUMMARY

Viewed from one aspect the present invention provides a wrist worn device comprising:
 a device housing formed of metal;
 an isolation body of electrically insulating material with a first static relative permittivity, said isolation body fixed to an outer portion of said device housing;
 a capacitive touch sensor having a conductive plate and configured to detect a capacitance provided between said conductive plate and an object brought into proximity to said conductive plate, said conductive plate having an inner major surface and an outer major surface, said conductive plate separated from said device housing by said isolation body;
 an outer plate of electrically insulating material with a second static relative permittivity, said second permittivity being greater than said first static relative permittivity, said outer plate fixed to said conductive plate via said outer major surface, said outer plate fully covering said outer major surface.

A useful combination for a wrist worn device is to use a device housing formed of metal and a capacitive touch sensor carried by the device housing and configured to detect a capacitance provided between a conductive plate of the capacitive touch sensor and an object brought into proximity to that conductive plate. A problem with this arrangement is that the physical size constraints of the wrist worn device are such that the capacitive plate is forced to be physically close to the metal device housing and this forms a relatively large parasitic capacitance with the conductive plate such that a smaller change in the total capacitance associated with the conductive plate is registered when an object, such as a user's finger, is brought into proximity to the conductive plate. This reduces the signal-to-noise ratio of the capacitive touch sensor. The present technique addresses this problem by providing an isolation body of electrically insulating material between the metal device housing and the conductive plate and providing an outer plate over the conductive plate. The isolation body is made of an electrically insulating material with a first static relative permittivity that is low whereas the outer plate is made of an electrically insulating material with a second static relative permittivity which is high. The high static relative permittivity associated with the outer plate relative to the low static relative permittivity associated with the isolation body has the effect of decreasing the effect of the parasitic capacitance with the metal device housing relative to the capacitance change induced by the object brought into proximity with the conductive plate, which it is desired to sense with the capacitive touch sensor. Thus, the signal-to-noise ratio of the capacitive touch sensor is increased. The outer plate of electrically insulating material also completely covers the outer major surface of the conductive plate thereby isolating this from the environment and providing isolation from direct conduction between the object brought into proximity and the conductive plate.

The isolation body in some embodiments may additionally serve to fix and/or support the conductive plate to and/or upon the device.

In some embodiments the first static relative permittivity is less than 3. An example of a material which may be used for the isolation body is PTFE (polytetrafluoroethylene).

In some embodiments the second static relative permittivity is more than 7. An example of a material which may be used for the outer plate is glass. The thinner this glass may be made, the larger the maximum change of capacitance due to the object brought into proximity with the conductive plate. Accordingly, in some embodiments the outer plate may be less than 0.001 meters in thickness and in preferred embodiments may have a thickness of substantially 0.0008 meters.

In order to improve the external appearance of the wrist worn device when the outer plate is formed of glass, an ink layer may be deposited between the conductive plate and the outer plate. This ink layer is visible through the outer plate and the ink layer prevents the conductive plate being visible through the outer plate. Thus, the form of the conductive plate may be hidden from the user and replaced by whatever pattern it is desired to form with the ink layer (such as a label/symbol for the sensor, or directions for the user).

The capacitive touch sensor may form part of a circuit in which the capacitance provided between the conductive plate and the object together with the capacitance between the conductive plate and the metal body housing provide part of a total capacitance value which controls operations to circuit. An example of such a circuit would be an oscillator, or a relaxation oscillator. In such embodiments, the circuit may be configured such that as the capacitance between the conductive plate and the metal body housing increases, a signal-to-noise ratio with which the capacitive touch sensor is able to detect the object is decreased. This behaviour is a reason for using an isolation body and an outer plate having the static relative permittivities previously discussed.

In some embodiments the circuit of which the capacitive touch sensor forms part may use a printed circuit layer within the device housing. This printed circuit layer typically will include a ground plane conductive layer. The signal-to-noise ratio of the capacitive touch sensor may be improved in some embodiments when the ground plane conductive layer is arranged to be discontinuous proximal to the one or more printed circuit tracks which connect the conductive plate to the circuit thereby the reducing parasitic capacitance associated with the ground plane adding to the total capacitance value which controls the operation of the circuit (and which is detected).

Viewed from another aspect the present invention provides a wrist worn device comprising:
 device housing means for housing circuitry, said device housing means formed of metal;
 isolation body means for providing isolation, said isolation body means formed of electrically insulating material with a first static relative permittivity, said isolation body means fixed to an outer portion of said device housing means;

capacitive touch sensor means for sensing a touch, said capacitive touch sensor means having a conductive plate and configured to detect a capacitance provided between said conductive plate and an object brought into proximity to said conductive plate, said conductive plate having an inner major surface and an outer major surface, said conductive plate separated from said device housing means by said isolation body means;

an outer plate of electrically insulating material with a second static relative permittivity, said second permittivity being greater than said first static relative permittivity, said outer plate fixed to said conductive plate via said outer major surface, said outer plate fully covering said outer major surface.

Viewed from a further aspect the present invention provides a method of forming a capacitive touch sensor within a wrist worn device having a device housing formed of metal, said method comprising the steps of:

fixing an isolation body of electrically insulating material with a first static relative permittivity to an outer portion of said device housing;

fixing a conductive plate of said capacitive touch sensor to said isolation body; and fixing an outer plate of electrically insulating material with a second static relative permittivity to said conductive plate, said second permittivity being greater than said first static relative permittivity.

Viewed from a further aspect the present invention provides a wrist worn device comprising:

a device housing comprising metal;

an isolation body of electrically insulating material with a first static relative permittivity, said isolation body coupled to said device housing;

a capacitive touch sensor having a conductive plate and configured to detect a capacitance provided between said conductive plate and an object brought into proximity to said conductive plate, said conductive plate having an inner major surface and an outer major surface, said conductive plate separated from said device housing by said isolation body;

an outer plate of electrically insulating material with a second static relative permittivity, said second permittivity being greater than said first static relative permittivity, said outer plate coupled to and covering said outer major surface.

BRIEF DESCRIPTION OF THE DRAWINGS

Embodiments of the invention will now be described, by way of example only, with reference to the accompanying drawings in which.

DESCRIPTION OF EXAMPLE EMBODIMENTS

Figure 1:
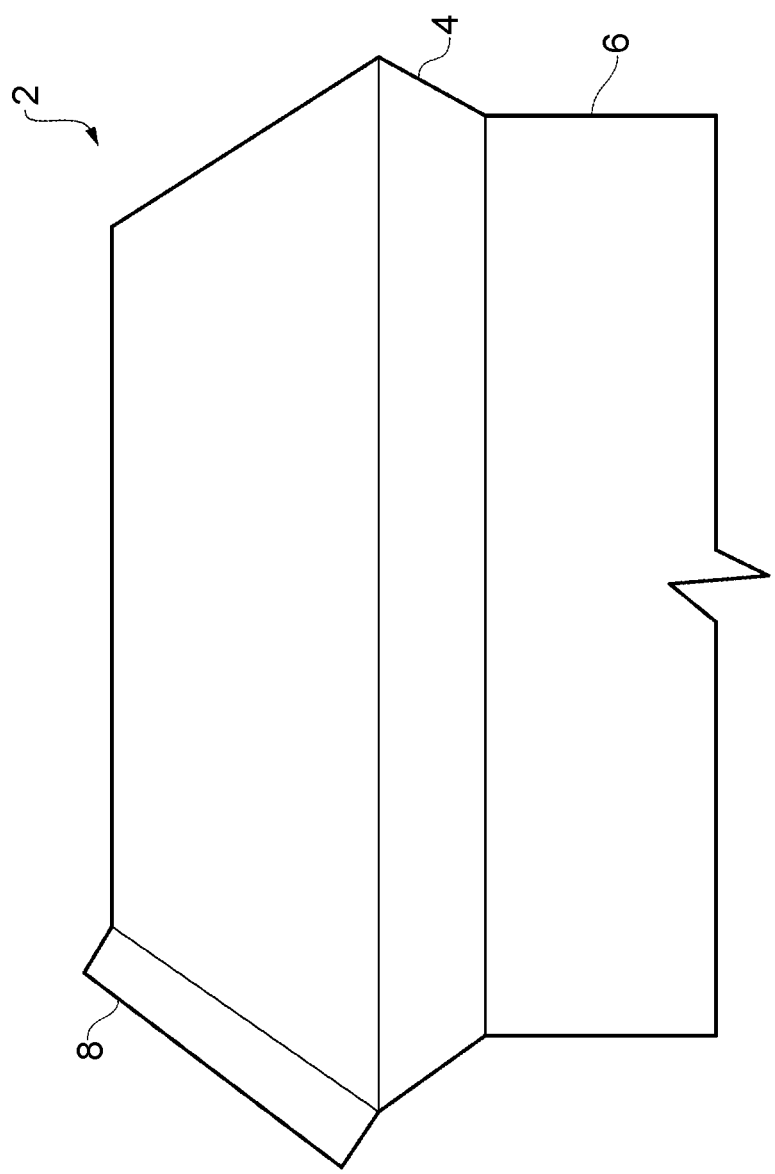
FIG. 1 schematically illustrates a side view of a wrist worn device including a capacitive touch sensor.

FIG. 1 schematically illustrates a wrist worn device 2 in the form of a smart watch. This wrist worn device includes a device housing 4 formed of metal attached via a strap 6 to a user's arm. One side of the device 2 incorporates a capacitive touch sensor 8. This touch sensor includes a conductive plate connected to a circuit within the device 2 as will be described later. When a user brings their finger into proximity to the capacitive touch sensor 8 (such as touching the sensor), this changes the capacitance associated with the conductive plate and alters the operation of the circuit coupled to that conductive plate. Thus, the circuit may detect the action of bringing the object (finger) into proximity with (touching) the capacitive touch sensor.

Figure 2:
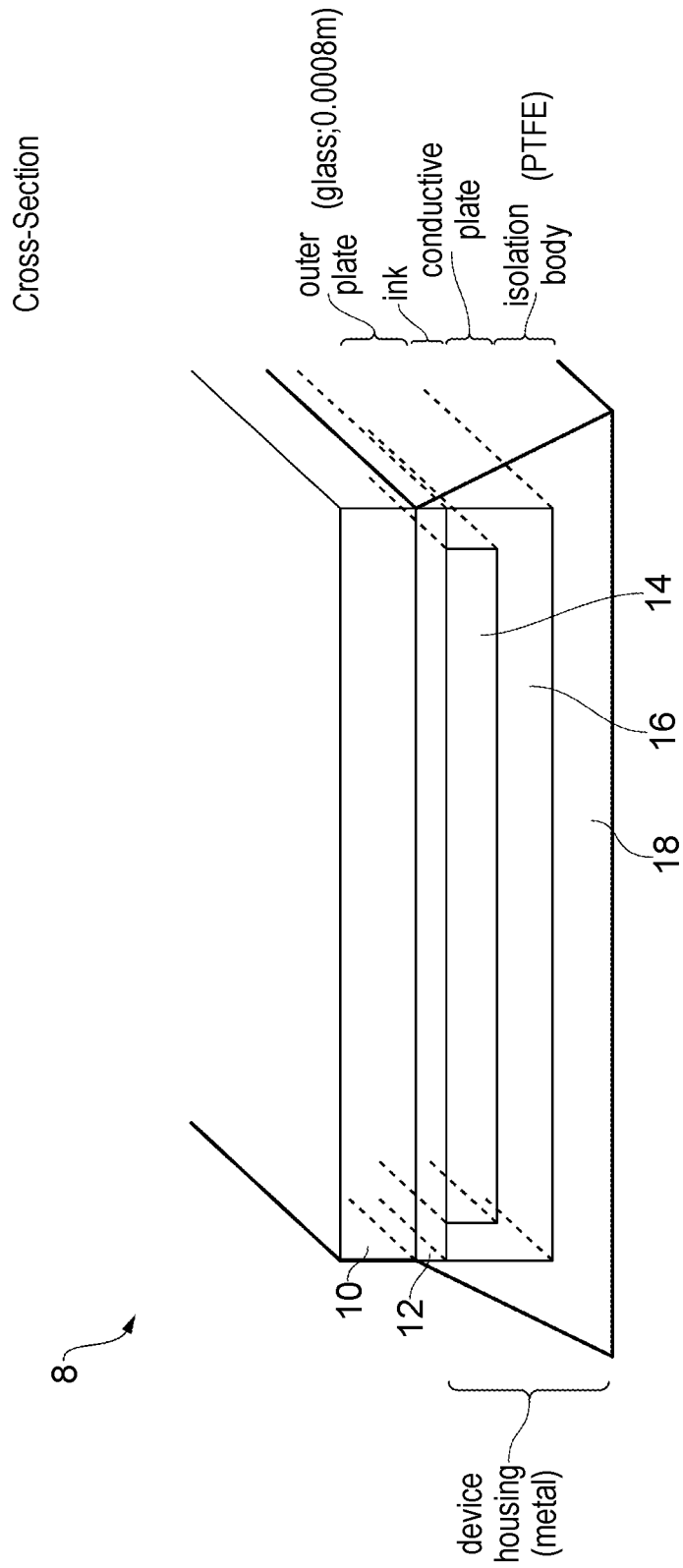
FIG. 2 schematically illustrates a section through the capacitive touch sensor.

FIG. 2 schematically illustrates a cross-section through the capacitive touch sensor 8. The capacitive touch sensor is covered by an outer plate 10 of electrically insulating material with a static relative permittivity that is relatively high. For example, the outer plate may be made of glass with a static relative permittivity of more than 7. Other materials may also be used where they have a relatively high static permittivity. The maximum change of capacitance associated with the bringing of the objects into close proximity with the conductive plate is increased when the thickness of the outer plate is decreased, i.e. the object can get closer to the conductive plate. The outer plate may have a thickness of less than 0.001 meters and in some embodiments may be formed of glass having a thickness of substantially 0.0008 meters.

Disposed beneath the outer plate 10 there is an ink layer 12 which may be printed on the inner major surface of the outer plate 10. This ink layer 12 prevents the conductive plate 14 being visible through the glass outer plate 10. Furthermore, a pattern may be formed in the ink layer 12 which is visible to a user through the transparent glass outer plate 10 and can provide information, such as labels or symbols indicating the nature of the touch sensor surface.

Beneath the ink layer 12 there is disposed a conductive plate 14 which forms one plate within a notional parallel plate capacitor which forms part of the circuit of the capacitor touch sensor. The other plates include the object being sensed and metal device housing 18. The conductive plate 14 may be formed of a thin layer of metal. An outer major surface of the conductive plate 14 touches the ink layer and is overlain by the glass outer plate 10. The glass outer plate 10 may completely cover the conductive plate 14 so as to protect it from the environment and to provide electrical insulation between the conductive plate 14 and the outside environment.

An isolation body 16 is formed beneath and around the sides of the conductive plate 14. This isolation body 16 serves to provide electrical insulation between the conductive plate 14 and the metal device housing 18. There is a capacitance between the conductive plate 14 and the metal device housing 18. The static relative permittivity of the isolation body 16 is chosen to be relatively low so as to reduce the size of this capacitance relative to the capacitance between the conductive plate 14 and an object (e.g. a finger) brought into proximity with the conductive plate on the other side of the outer plate 10. The isolation body may be formed of a material having a static relative permittivity of less than 3. An example of a suitable material is PTFE (polytetrafluorethylene). The physically constrained size of a wrist worn device is such that simply increasing the spacing between the conductive plate 14 and the device housing 18 is difficult to accommodate. Accordingly, appropriate choices of dielectric materials can be used so as to reduce the capacitive effect of the metal device housing and increase the capacitive effect of an object it is desired to sense.

Figure 3:
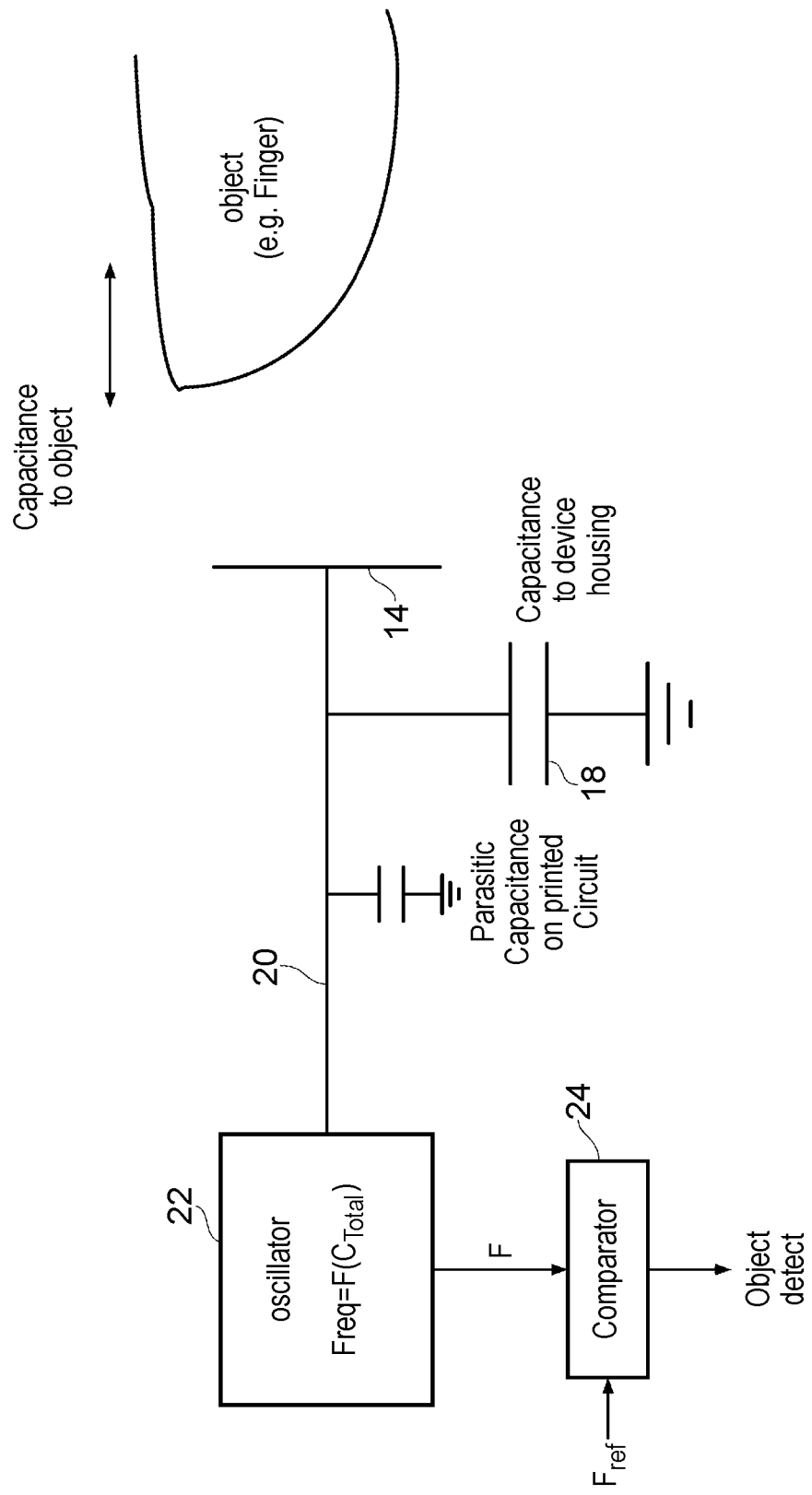
FIG. 3 schematically illustrates a circuit associated with the capacitive touch sensor.

FIG. 3 schematically illustrates a circuit of which the capacitive touch sensor forms part. In particular, the conductive plate 14 can be considered to form one plate of a parallel of plate capacitor with the other plate being provided by an object (e.g. a finger) brought into proximity with that conductive plate 14. Depending upon the distance between the object and the conductive plate 14, the capacitance associated with the conductive plate 14 varies.

The capacitance between the conductive plate 14 and the device metal housing 18 is added to the total capacitance associated with the conductive plate 14. Accordingly, decreasing the size of the capacitance between the conductive plate 14 and the metal housing 18 relative to the capacitance between the conductive plate 14 and the object serves to increase the signal-to-noise ratio of the touch sensor.

The conductive plate 14 is connected via tracks 20 crossing a circuit layer within the device housing to an oscillator circuit 22. The parasitic capacitance associated with these tracks 20 may be reduced by rendering discontinuous a ground plane conductor within the printed circuit layer which is proximal to this track. It will be understood by those in this technical field that such compact printed circuit boards typically include a ground plane for use in controlling the capacitance associated with signal lines passing through the printed circuit board.

The oscillator 22 (e.g. a relaxation oscillator) has an oscillation frequency which is changed by the capacitance coupled to the oscillator circuit 22 via the track 20. Thus, in order to improve the signal-to-noise ratio associated with detecting the object moving close to the conductive plate 14, it is desirable to reduce the capacitance associated with the metal device housing body 18 and the parasitic capacitance under the track on the circuit layer. A comparator 24 responds to a change in the frequency generated by the oscillator circuit 22 to indicate whether or not an object has been detected. In particular, the comparator 24 may compare the frequency generated by the oscillator circuit 22 with a reference frequency and a difference in frequency above a threshold level may indicate that an object has been placed into proximity with the conductive plate 14, i.e. a touch is detected.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A wrist worn device comprising:
   a device housing formed of metal;
   an isolation body formed of PTFE with a first static relative permittivity, said isolation body fixed to said device housing;
   a capacitive touch sensor having an electrically conductive plate and configured to detect a capacitance provided between said electrically conductive plate and an object brought into proximity to said electrically conductive plate, said electrically conductive plate having an inner major surface and an outer major surface, said electrically conductive plate separated from said device housing by said isolation body;
   an outer plate of electrically insulating material with a second static relative permittivity, said second permittivity being greater than said first static relative permittivity, said outer plate fixed to said electrically conductive plate via said outer major surface, said outer plate fully covering said outer major surface.

2. A wrist worn device as claimed in claim 1, wherein said electrically conductive plate is fixed to said isolation body.

3. A wrist worn device as claimed in claim 1, wherein said electrically conductive plate is supported by said isolation body via said inner major surface.

4. A wrist worn device as claimed in claim 1, wherein said first static relative permittivity is less than 3.

5. A wrist worn device as claimed in claim 1, wherein said second static relative permittivity is more than 7.

6. A wrist worn device as claimed in claim 1, wherein said outer plate is formed of glass.

7. A wrist worn device as claimed in claim 6, wherein an ink layer is disposed between said electrically conductive plate and said outer plate, said ink layer being visible through said outer plate and said ink layer preventing said electrically conductive plate being visible through said outer plate.

8. A wrist worn device as claimed in claim 1, wherein said capacitive touch sensor comprises a circuit in which said capacitance provided between said electrically conductive plate and said object and a capacitance between said electrically conductive plate and said body housing provide part of a total capacitance value controlling operation of said circuit.

9. A wrist worn device as claimed in claim 8, wherein said circuit is configured such that as said capacitance between said electrically conductive plate and said body housing increases a signal-to-noise ratio with which said capacitive touch sensor is able to detect said object is decreased.

10. A wrist worn device as claimed in claim 8, wherein said circuit uses a printed circuit layer within said device housing, said printed circuit layer including a ground plane conductive layer, said ground plant conductive layer being discontinuous proximal to one or more printed circuit tracks connecting said electrically conductive plate to said circuit thereby reducing parasitic capacitance adding to said total capacitance value.

11. A wrist worn device as claimed in claim 1, wherein said outer plate has a thickness of less than 0.001 meters.

12. A wrist worn device as claimed in claim 1, wherein said outer plate has a thickness of substantially 0.0008 meters.

13. A wrist worn device comprising:
   device housing means for housing circuitry, said device housing means formed of metal;
   isolation body means for providing isolation, said isolation body means formed of PTFE with a first static relative permittivity, said isolation body means fixed to said device housing means;
   capacitive touch sensor means for sensing a touch, said capacitive touch sensor means having an electrically conductive plate and configured to detect a capacitance provided between said electrically conductive plate and an object brought into proximity to said electrically conductive plate, said electrically conductive plate having an inner major surface and an outer major surface, said electrically conductive plate separated from said device housing means by said isolation body means;
   an outer plate of electrically insulating material with a second static relative permittivity, said second permittivity being greater than said first static relative permittivity, said outer plate fixed to said electrically conductive plate via said outer major surface, said outer plate fully covering said outer major surface.

14. A method of forming a capacitive touch sensor within a wrist worn device having a device housing formed of metal, said method comprising the steps of:

fixing an isolation body formed of PTFE with a first static relative permittivity to said device housing;

fixing an electrically conductive plate of said capacitive touch sensor to said isolation body; and fixing an outer plate of electrically insulating material with a second static relative permittivity to said electrically conductive plate, said second permittivity being greater than said first static relative permittivity.

15. A wrist worn device comprising:

a device housing comprising metal;

an isolation body formed of PTFE with a first static relative permittivity, said isolation body coupled to said device housing;

a capacitive touch sensor having an electrically conductive plate and configured to detect a capacitance provided between said electrically conductive plate and an object brought into proximity to said electrically conductive plate, said electrically conductive plate having an inner major surface and an outer major surface, said electrically conductive plate separated from said device housing by said isolation body;

an outer plate of electrically insulating material with a second static relative permittivity, said second permittivity being greater than said first static relative permittivity, said outer plate coupled to and covering said outer major surface.

* * * * *